(12) United States Patent
Lesimple

(10) Patent No.: US 11,265,327 B2
(45) Date of Patent: Mar. 1, 2022

(54) SYSTEMS AND METHODS FOR CONNECTION MANAGEMENT

(71) Applicant: OVH, Roubaix (FR)

(72) Inventor: Stephane Lesimple, Tourcoing (FR)

(73) Assignee: OVH, Roubaix (FR)

( * ) Notice: Subject to any disclaimer, the term of this patent is extended or adjusted under 35 U.S.C. 154(b) by 129 days.

(21) Appl. No.: 16/678,374

(22) Filed: Nov. 8, 2019

(65) Prior Publication Data

US 2020/0153837 A1 May 14, 2020

(30) Foreign Application Priority Data

Nov. 12, 2018 (EP) ..................................... 18315038

(51) Int. Cl.
| | | |
|---|---|---|
| *G06F 21/00* | (2013.01) | |
| *H04L 29/06* | (2006.01) | |
| *H04L 9/30* | (2006.01) | |
| *H04L 9/32* | (2006.01) | |

(52) U.S. Cl.
CPC .............. *H04L 63/102* (2013.01); *H04L 9/30* (2013.01); *H04L 9/32* (2013.01); *H04L 63/0428* (2013.01); *H04L 63/104* (2013.01); *H04L 63/105* (2013.01)

(58) Field of Classification Search
CPC . H04L 63/102; H04L 9/30; H04L 9/32; H04L 63/0428; H04L 63/104; H04L 63/105; H04L 63/0464; H04L 63/0823; H04L 63/1425
See application file for complete search history.

(56) References Cited

U.S. PATENT DOCUMENTS

| | | | |
|---|---|---|---|
| 7,716,467 B1 | 5/2010 | Deffet et al. | |
| 8,539,557 B1 * | 9/2013 | Buckner | G06F 21/31 726/4 |
| 9,189,900 B1 * | 11/2015 | Penilla | H04L 9/14 |
| 10,063,591 B1 * | 8/2018 | Jiang | H04L 63/0464 |

(Continued)

FOREIGN PATENT DOCUMENTS

EP 3328024 A1 5/2018

OTHER PUBLICATIONS

Davids, P., and R. Karabek. "Transport protocols and client server applications." XTP Research Affiliate Annual Report (1994): 100-2. (Year: 1994).*

(Continued)

*Primary Examiner* — Kendall Dolly
(74) *Attorney, Agent, or Firm* — BCF LLP

(57) ABSTRACT

Methods and systems are described for managing connections between client devices and servers. A client device may establish a connection with a connection manager device. The client device may request to establish a connection with a server. The connection manager may determine whether a user of the client device has user privileges to access the server. The connection manager may determine whether the user is a member of a group that has privileges to access the server. The connection manager may retrieve user or group credentials for accessing the server. The connection manager may establish a connection with the server. The connection manager may coordinate communications between the client device and the server. The connection manager may record the communications between the client device and the server.

17 Claims, 10 Drawing Sheets

(56) References Cited

U.S. PATENT DOCUMENTS

| | | | |
|---|---|---|---|
| 2015/0222604 A1* | 8/2015 | Ylonen | G06F 21/575 |
| | | | 713/171 |
| 2016/0183087 A1 | 6/2016 | Lehtinen et al. | |
| 2016/0234209 A1 | 8/2016 | Kahol et al. | |
| 2018/0152299 A1* | 5/2018 | Rossi | H04L 9/14 |
| 2021/0203491 A1* | 7/2021 | Wei | H04L 9/321 |

OTHER PUBLICATIONS

Extented European Search Report with regard to the counterpart EP Patent Application No. 18315038.2 completed May 2, 2019.
Lonvick et al., "The Secure Shell (SSH) Authentication Protocol", The Secure Shell (SSH) Authentication Protocol; Internet Engineering Task Force, IETF; Standard, Internet Society (ISOC) 4, Switzerland, 2006, 17 pages.

* cited by examiner

SYSTEMS AND METHODS FOR CONNECTION MANAGEMENT

CROSS-REFERENCE

The present application claims priority to European Patent Application No. 18315038.2, entitled "SYSTEMS AND METHODS FOR CONNECTION MANAGEMENT," filed on Nov. 12, 2018, the entirety of which is incorporated herein by reference.

FIELD

Embodiments described herein relate generally to systems and methods for managing connections, and more particularly, to systems and methods for establishing and/or monitoring connections between users and servers.

BACKGROUND

Users may connect to servers to perform various commands on the servers, such as to access services provided by the servers. For security and other reasons, access to a server may be controlled. To access a server, a user may authenticate with the server. Various methods may be used to authenticate the user, such as public key authentication, a username and password, or other methods of authentication.

When a user has access to multiple servers, each server may store a key corresponding to the user. Each individual server may store many keys, one key for each of the users having access to that server. As the number of network administrators grows, managing this growing volume of keys may be overly complex and time consuming. For example, when a user's access rights are revoked, the user's key should be removed from each server that the user previously had access to. Additionally, whenever a new user is given access rights to servers, a key for the user must be placed on each of the servers. It may be desirable to more efficiently manage the distribution of keys.

A network operator may wish to perform various audits relating to network security, such as determining which servers each user has access to and/or determining what operations users have performed on servers. It may be difficult to determine which servers each user of the network has access to. Connections between the user and the server may be encrypted. Because the connections are encrypted, it may be difficult to record information about which users are accessing which servers, and the contents of communications between the users and the servers. It may be desirable to log information regarding the connections, such as information indicating which user's are accessing which servers. It may also be desirable to record the communications that occur between users and servers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only, and is not intended to limit or constrain the detailed description. The following summary merely presents various described aspects in a simplified form as a prelude to the more detailed description provided below.

An intermediate device, which is referred to herein as a connection manager, may be used to manage and/or establish connections between client devices, which are accessed by users, and servers or other network devices that the users request to access. The client device may establish a connection with the connection manager. The connection manager may authenticate the client device, such as by using public key authentication, which may be referred to as public key cryptography. The public key authentication may be performed using the secure shell (SSH) protocol. To perform public key authentication, one party may hold a private key that allows communications encrypted with a corresponding public key to be decrypted.

A client device may request to access a server. The client device may transmit the request to the connection manager. The connection manager may determine whether the client device is authorized to access the requested server. If the client device is authorized to access the requested server, the connection manager may retrieve a key corresponding to the requested server.

After retrieving the key corresponding to the requested server, the connection manager may establish a connection between the connection manager and the requested server. The connection manager may indicate, to the client device, that a connection has been established between the connection manager and the requested server. The connection manager may receive communications from the client device and forward those communications to the requested server, and/or the connection manager may receive communications from the requested server and forward those communications to the client device.

The connection manager may record the communications between the client device and the requested server. The connection manager may store the recorded communications. The connection manager may record information about each connection, such as an indication of the client device, user, server, time that the connection was established, length of the connection, and/or other information regarding the connection.

The connection manager may comprise information regarding groups. Each group may have access to one or more servers. The connection manager may receive a request from a client device to modify information regarding a group, such as which users are in the group, which servers the group has access to, the roles of users within the group, or other information regarding the group. The connection manager may determine whether the user accessing the client device has sufficient privileges to perform the requested modification. After confirming that the user has sufficient privileges to perform the modification to the group, the connection manager may modify the group.

In one aspect, various implementations of the present technology may provide a method comprising: receiving, from a client device, a request to establish a connection with a server, wherein the request indicates a user of the client device; authenticating, using a public key corresponding to the client device, the user; determining whether the user has privileges to access the server; after determining that the user is authorized to access the server, retrieving a private key corresponding to the server; establishing, using the private key, a connection to the server; coordinating communications between the client device and the server; and recording the communications between the client device and the server.

In the context of the present specification, unless expressly provided otherwise, a computer system may refer, but is not limited to, an "electronic device," an "operation system," a "system," a "computer-based system," a "controller unit," a "monitoring device," a "control device," a "network device," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and/or tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Implementations of the present technology each may have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
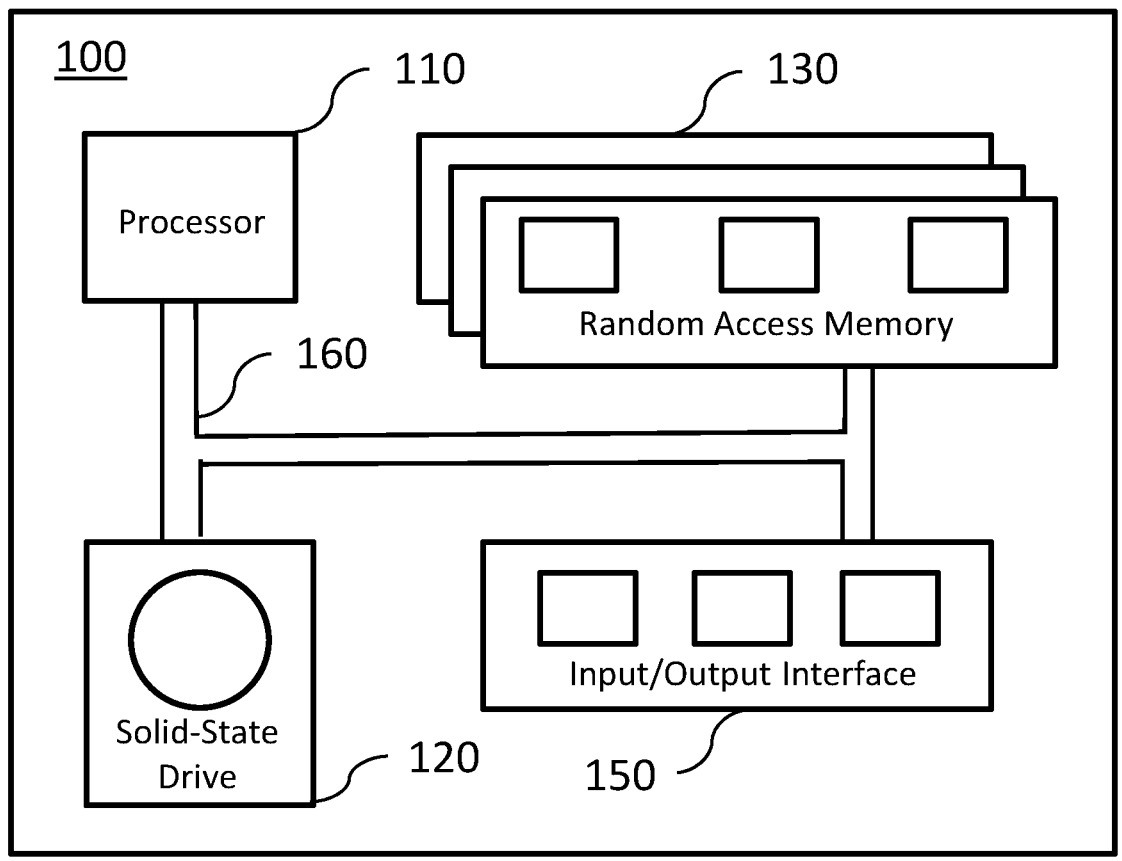
FIG. 1 shows an example computing system that may be used to implement any of the methods described herein.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Users accessing client devices may wish to establish secure communication sessions with servers. Although referred to herein as servers, client devices may establish communication sessions with other types of network devices, such as routers or switches. In order to establish the communication session, the client device may authenticate with the server. The client device may then perform various commands on the server. In this way, the user can access services provided by the server.

In order for a user to access a group of servers, private and public key pairs may be placed on each client device of the user and each server that the user is permitted to access. This may be a cumbersome process when users are frequently being added to or removed from the network. Each time a user is added, private and public key pairs may be generated for each client device used by the user and each server accessible to the user. A public key may be placed on each of the servers accessible to the user. Each time a user is removed, a public key corresponding to the user may be removed from each server that the user had access to.

A network operator may wish to perform various audits of a network, such as determining a list of every user with access privileges to the network, and a list of servers that each user has access to. A scan may be performed of each server on the network, to determine which keys are stored on the servers. Then, a list of users that have access to each of the servers may be generated. This scan may be time-consuming to perform.

A network operator may wish to control access to servers and other devices, to perform audits on the network, and/or to monitor communication sessions between client devices and servers. An intermediate device, such as a connection manager, may coordinate communications between client devices and servers. The connection manager may facilitate controlling access to servers. The connection manager may more efficiently perform network audits. The connection manager may record communications sessions between client devices and servers. The connection manager may authenticate client devices, establish sessions with servers, log connections, and/or record data transmitted between client devices and servers.

The connection manager may comprise user and group data that indicate which groups each user is a member of and the roles of each member within the groups. The user and group data may indicate which server keys a user has access to, either through their own access rights or through group membership.

In order to increase security, the operating system of the connection manager may restrict access to the server keys. The operating system may comprise a definition of which users and groups can access which keys. The operating system may restrict access to the keys based on these definitions. Thus in order to access a key a user may pass through two verifications, a first verification performed by software executing on the connection manager, and a second verification performed by the operating system of the connection manager. Even if an intruder is able to modify the software executing on the connection manager, the operating system of the connection manager may prevent unauthorized access to server keys. This may decrease the possibility that an unauthorized intruder, such as a hacker, would be able to gain access to any servers. This may also decrease the possibility that an authorized user would be able to gain access to a server that the authorized user is not permitted to access.

FIG. 1 illustrates a diagram of a computing environment 100 in accordance with an embodiment of the present technology. In some embodiments, the computing environment 100 may be implemented by any of a conventional personal computer, a server, a router, a switch, a controller, and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a memory device, for example a random access memory 130, and an input/output interface 150. The computing environment 100 may be a computer specifically designed for operating in a data center environment. The computing environment 100 may be a generic computer system.

In some embodiments, the computing environment 100 may also be a sub-system of one of the above-listed systems. In some embodiments, the computing environment 100 may be an "off the shelf" generic computer system. In some embodiments, the computing environment 100 may be distributed amongst multiple systems. The computing environment 100 may be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

Figure 2:
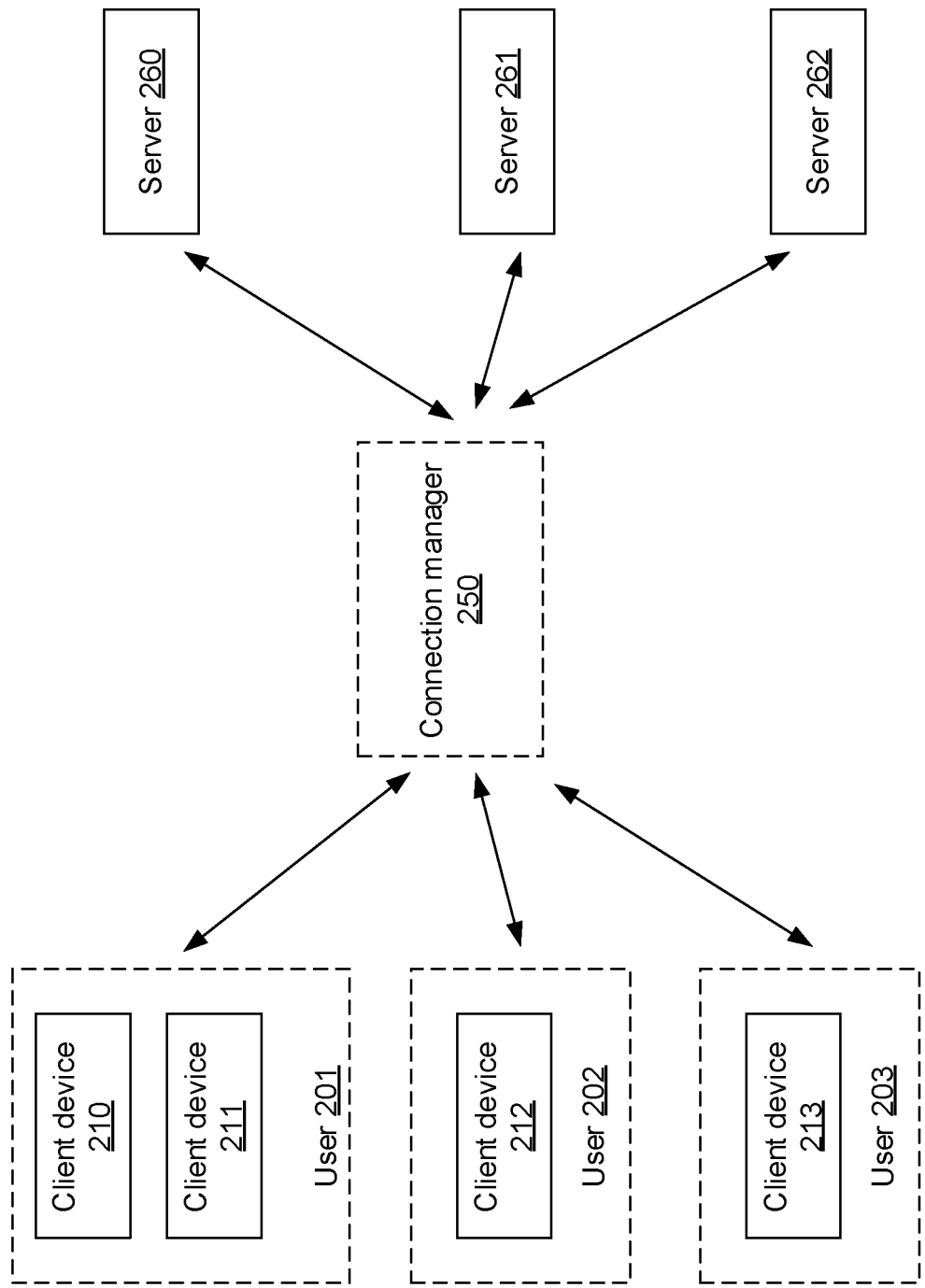
FIG. 2 shows an example of devices communicating via a connection manager according to one or more illustrative aspects of the disclosure.

FIG. 2 shows an example of devices communicating via a connection manager according to one or more illustrative aspects of the disclosure. The users 201-03 may use client device 210-13 to access servers 260-62 via the connection manager 250. The user 201 may use client devices 210 or 211 to connect to the connection manager 250. The users 202 and 203 may use the client devices 212 and 213, respectively, to connect to the connection manager 250.

The users 201-03 may authenticate with their respective client devices 210-13. The users 201-03 may enter a username and password, perform a biometric authentication, use a physical device to authenticate, and/or use any other authentication method to authenticate with the client devices 210-13. For example fingerprint recognition, facial recognition, a retinal scan, two-factor authentication, and/or a YubiKey may be used to authenticate the users 201-03 with the client devices 210-13. It should be understood that in some configurations a user 201-03 may access a client device 210-13 without authenticating with the client device 210-13. A user 201-03 might not authenticate with the client device 210-13 each time the user 201-03 accesses the client device 210-13. For example a user may authenticate with one of the client device 210-13, and that authentication may be valid for 30 days. In another example, if a user 201-03 is accessing the client device 210-13 on a known network, authentication might not be requested. Whereas, in this example, if the user 201-03 is accessing the client device 210-13 on an unknown network, authentication may be requested.

After a user 201-03 has authenticated with one of the client devices 210-13, the user 201-03 may request access to one of the servers 260-62. The user 201-03 may use a terminal on the client device 210-13, such as an SSH terminal, to request a connection with one of the servers 260-62. The request may be transmitted from one of the client devices 210-13 to the connection manager 250.

After receiving a request from one of the client devices 210-13, the connection manager 250 may authenticate the user 201-03 accessing the client device 210-13. The connection manager may use public key authentication to authenticate the user 201-03. Private keys corresponding to the users 201-03 may be stored on their respective client devices 210-13. Each user may have multiple associated private keys. A first private key corresponding to the user 201 may be stored on the client device 210, and a second private key corresponding to the user 201 may be stored on the client device 211. Alternatively, the same private key corresponding to the user 201 may be stored on both client devices 210 and 211. If different private keys are stored by the client devices 210 and 211, then two different public keys, each corresponding to one of the private keys, may be stored on the connection manager 250.

After a client device 210-13 requests access to the connection manager 250, the connection manager 250 may retrieve a public key corresponding to the user 201-03 and/or the client device 210-13 requesting access. The public key may then be used to authenticate the requesting client device 210-13 through public key authentication. One or more messages, which may be encrypted messages, may be transmitted between the connection manager 205 and the requesting client device 210-13 to perform the public key authentication. An SSH session may be opened between the requesting client device 210-13 and the connection manager 250.

Other authentication methods may be used to authenticate the requesting client device 210-13 with the connection manager 250. For example, a username and/or password combination corresponding to the user 201-03 may be used to authenticate the requesting client device 210-13 with the connection manager 250, such as in HTTPS authentication.

After the connection manager 250 has authenticated the requesting client device 210-13, the connection manager 250 may determine the access rights of the user 201-03. A database, or other data storage structure, may be queried to determine which servers 260-62 the user 201-03 has access to. A level of access may also be determined for the user 201-03, such as whether the user has root access or some other level of access to the server 260-62. If the user has access to the requested server 260-62, a private key of the user may be retrieved by the connection manager 250.

The user 201-03 may be a member of one or more groups. The connection manager 250 may query a database, or other data storage structure, to determine which groups the user 201-03 is a member of. If any of the groups has access to the requested server 260-62, the private keys corresponding to those groups and the requested server may be retrieved.

After retrieving one or more personal private keys and/or group private keys, the connection manager 250 may establish a connection with the requested server 260-62. The connection may be an SSH connection. Public key authentication may be used to authenticate the connection manager 250 with the requested server 260-62. Although described above as using public key authentication, it should be understood that other authentication methods may be used. For example, rather than retrieving one or more private keys, one or more username and password combinations may be retrieved, and a connection may be established between the connection manager 250 and the requested server 260-62 using the username and password. Data transmitted between the connection manager 50 and requested server 260-62 may be encrypted.

The requesting client device 210-13 may be able to use the private key for connection to the requested server 260-62 via the connection manager 250, but might not be able to extract the key from the connection manager 250. The requesting client device 210-13 might not be permitted to retrieve the key from the connection manager 250. Rather, each time the requesting client device 210-13 wishes to connect to the requested server 260-62, the requesting client device 210-13 may connect via the connection manager 250. Various security features of the connection manager 250 may be configurable. A connection manager 250 used in a development environment may be operated with some deactivated security features.

After the connection manager 250 has established a connection with the requested server 260-62, the connection manager 250 may transmit an indication, to the requesting client device 210-13, that the connection has been established. The connection manager 250 may coordinate communications between the requesting client device 210-13 and the requested server 260-62.

The connection manager 250 may link the two connections. Communications received from the requesting client device 210-13 may be received and decrypted by the connection manager 250. The connection manager 250 may then encrypt the decrypted data and transmit the encrypted data to the requested server 260-62. Communications received by the connection manager from the requested server 260-62 may be decrypted by the connection manager 250. The connection manager 250 may encrypt the decrypted data and transmit the encrypted data to the requesting client device 210-13. In this fashion, the requesting client device 210-13 may communicate with the requested server 260-62. The user 201-03 may enter commands on an SSH terminal executing on the requesting client device 210-13, and those commands may be executed on the requested server 260-62.

Decrypted communications may be recorded by the connection manager 250. The recorded communications may be stored by the connection manager 250, such as in a log. The connection manager 250 may record various details about the connection, such as the time at which the connection was initialized, time at which the connection was terminated, user 201-03 that requested the connection, client device 210-13 that requested the connection, the server 260-62 that was connected to, whether a user key or group key was used to connect to the server 260-62, which key was used to connect to the server 260-62, and/or any other information regarding the connection between the requesting client device 210-13 and the requested server 260-62.

Upon receiving a request to terminate the connection from the requesting client device 210-13 and/or the requested server 260-62, the connection manager 250 may terminate the connection between the devices. The connection manager 250 may terminate the connection after a pre-determined amount of time has passed. The connection may be terminated after a pre-determined amount of time has passed in which no communications occur between the devices.

Although FIG. 2 illustrates an exemplary network arrangement, any number of client devices 210-13, connection managers 250, and servers 260-62 may be used. A cluster of connection manager 250 servers may be used, such as to ensure that the connection manager 250 is available even if one of the connection manager 250 servers is offline. Multiple connection managers 250 may be used. A first connection manager 250 may be accessible via public and private IP addresses, and a second connection manager 250 may be accessible via private IP addresses but inaccessible via public IP addresses. The second connection manager 250 may thus be more secure, because it is inaccessible via public IP addresses. The first connection manager 250 may provide access to a first group of servers and the second connection manager 250 may provide access to a second group of servers. The second group of servers may be a group of servers for which security is considered more critical than the first group of servers.

Figure 3:
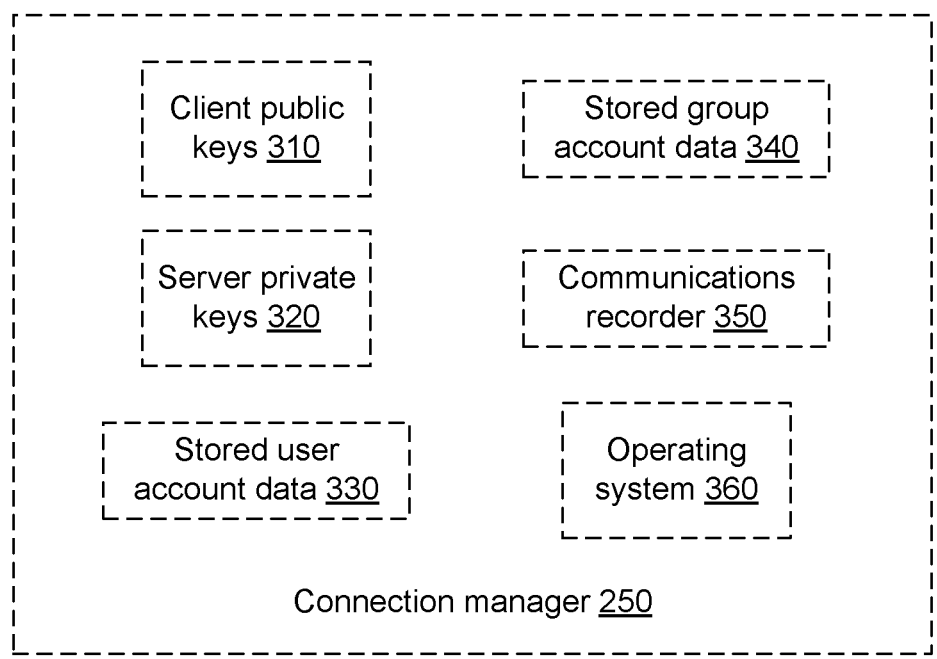
FIG. 3 shows an example of a connection manager device according to one or more illustrative aspects of the disclosure.

FIG. 3 shows an example of a connection manager 250 device according to one or more illustrative aspects of the disclosure. The connection manager 250 may be implemented on the computing environment 100. The elements illustrated as being comprised within the connection manager 250 may be implemented within the connection manager 250, may be implemented in separate devices that are in communication with the connection manager 250, and/or any combination thereof. As described above, the connection manager 250 may manage connections between client devices 210-13 and servers 260-62.

The connection manager may comprise one or more client public keys 310. Each client device 210-13 that is configured to access the connection manager 250 may have a corresponding client public key 310 stored on the connection manager 250. When a client device 210-13 requests to establish a connection with the connection manager 250, the corresponding client public key 310 may be retrieved and used to authenticate the requesting client device 210-13.

Stored user account data 330 may indicate which servers 260-62 a user 201-03 has access to. For each server 260-62, the stored user account data 330 may comprise access rights data for establishing a connection with the server 260-62. The access rights data may indicate which port to use when connecting to a server 260-62.

The access rights data may indicate a specific port number, or may indicate a wildcard, in which case any port may be used to establish a connection with the server 260-62. The access rights data may indicate an address corresponding to the server 260-62. The address may be a single IP address, a range of IP addresses, such as a whole subnet, or any other type of address. The access rights data may comprise a username to use when connecting to the server 260-62, such as "root," a wildcard in which case any username may be used, or any other user. The stored user account data 330 may be stored in a database or any other data storage structure.

Stored group account data 340 may comprise, for each group, a list of users in the group and/or a list of servers that the group has access to. The stored group account data 340 may indicate the roles of each user within the group. Roles within a group are further discussed below, with regards to FIGS. 6 and 7. The stored group account data may comprise, for each server, access rights data, as described above. Although illustrated as separate, all or portions of stored user account data 330 and stored group account date 340 may be combined.

The stored user account data 330 and stored group account data 340 may be used to determine whether a user 201-03 has access rights to a server 260-62. After the determination has been made, private keys for accessing the servers 260-62 may be retrieved from the server private keys 320.

Communications recorder 350 may record all or a portion of communications between the client devices 210-13 and the servers 260-62. For each communication between the client devices 210-13 and the servers 260-62, the communications recorder 350 may store a timestamp corresponding to the communication and/or data of the communication. The stored data may be used to replay the data output on a terminal at a client device 210-13 and/or server 260-62.

An operating system 360 may manage the hardware and software of the connection manager. The operating system 360 may be a Linux-based operating system, Unix-based operating system, Windows operating system, or any other type of operating system. The users and/or groups may be defined in the operating system 360, in other words, the users 201-03 and groups of the connection manager 250 may be system users and system groups of the operating system 360. The operating system 360 may restrict access to the server private keys 320 to certain users 201-03 and/or groups.

The connection manager may comprise one or more server private keys 320. Each of the server private keys 320 may be associated with an individual user 201-03 or a group. One or more of the server private keys 320 may be retrieved when the connection manager is establishing a connection with one of the servers 260-62.

Figure 4A:
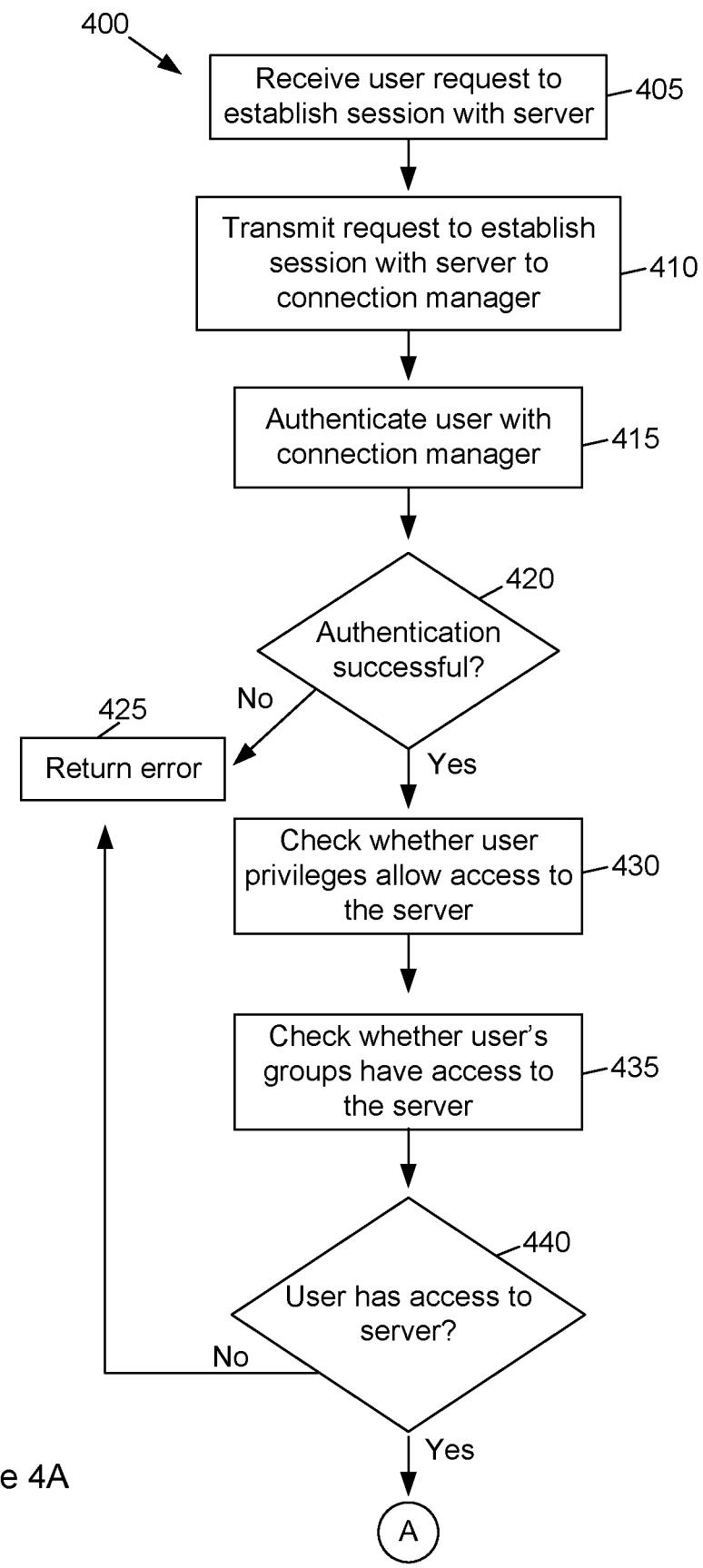
FIGS. 4A-C are a flow diagram of a method for establishing a connection between a client device and a server according to one or more illustrative aspects of the disclosure.
Figure 4B:
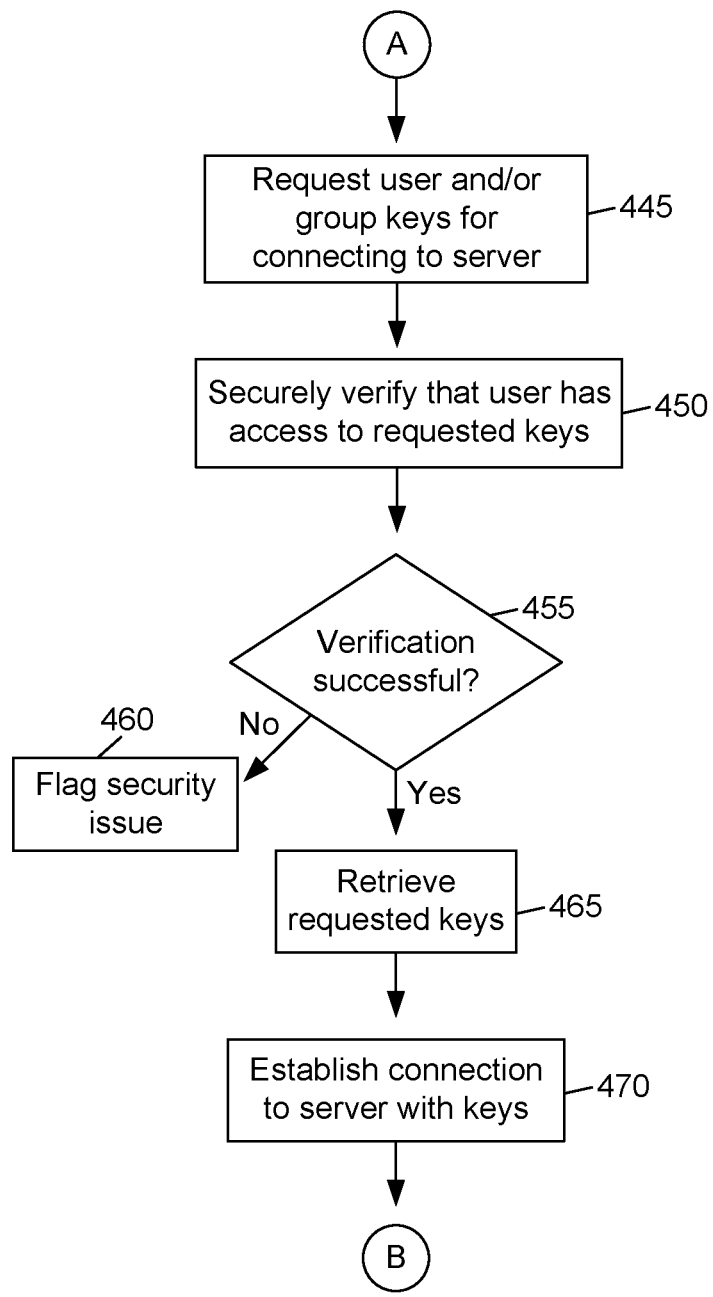
Figure 4C:
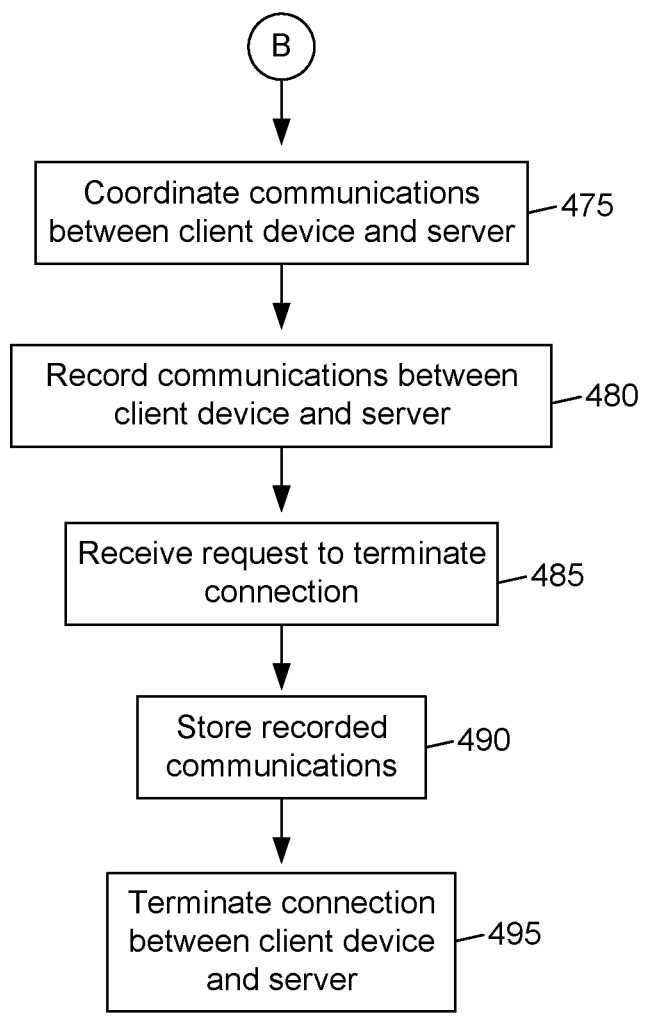

FIGS. 4A-C are a flow diagram of a method 400 for establishing a connection between a client device and a server according to one or more illustrative aspects of the disclosure. In one or more embodiments, the method 400 or one or more steps thereof may be performed by one or more computing devices or entities. Without limitation, all or portions of the method 400 may be executed by the client devices 210-13, connection manager 250, and/or servers 260-62. All or portions of the method 400 may be performed by components of the computing device 100. The method 400 or one or more steps thereof may be embodied in computer-executable instructions that are stored in a computer-readable medium, such as a non-transitory computer-readable medium. Some steps or portions of steps in the flow diagram may be omitted or changed in order.

At step 405 a user request to establish a session with a server may be received. The user request may comprise an IP address of the requested server, name of the requested server, and/or any other identifying information corresponding to the requested server. The user request may be received via a terminal or any other type of graphical user interface (GUI). Although described as a user request, the request may be generated by a software program, such as software executing on one of the client devices 210-13.

The request to establish the session may be received by a client device. Prior to inputting the request, the user may have been authenticated by the client device. For example, the user may have entered a username and/or password to verify their identity.

At step 410 a request to establish the session with the requested server may be transmitted. The request may be transmitted to a connection manager device, such as the connection manager 250. The request may comprise the IP address and/or other identifying information indicating the requested server. The request may comprise information about the requesting client device and/or user accessing the requesting client device. The request may comprise an IP address of the client device, identifying information of the user, and/or any other information regarding the client device or user.

At step 415 the user and/or client device may be authenticated by the connection manager. As described above, public key authentication may be used to authenticate the user with the connection manager. The connection manager may retrieve a public key corresponding to the user and/or client device, and may use the public key to authenticate the user and/or client device. The user may be a system user defined in the operating system of the connection manager. The user's access rights on the connection manager may be controlled by the operating system based on the definition of the user within the operating system.

At step 420 a determination may be made as to whether the authentication was successful or whether the authentication failed. If the authentication failed, an error may be returned at step 425. An administrator may be notified that an authentication failure occurred. The authentication failure may be logged.

If the authentication is determined to have been successful at step 420, a session may be opened between the requesting client device and the connection manager. After opening the session, at step 430 a determination may be made as to whether the user has privileges to access to the requested server 260-62. Keys corresponding to the user and stored on the connection manager may be retrieved and examined to determine whether any of the keys correspond to the requested server. A database, such as the stored user account data 330, may be queried to determine whether the user has privileges to access the requested server.

At step 435 a determination may be made as to whether the user is a member of any groups that provide access to the requested server. The users may be a member of one or more groups. Each group may have access to one or more servers. A list of groups that the user is a member of may be determined. Each group in the list may be examined to determine whether that group has access to the requested server. Stored group account data 340 may be queried to determine which groups the user is a member of and/or which servers each group has access to.

Groups may have various pre-defined roles for members of the group. Users that are members of the same group, but have different assigned roles within the group, may have access to different servers. For example, an associate of the group may have access to all servers used by the group, whereas a guest of the group may have access to a subset of the servers used by the group. At step 435, the user's role within each group may be determined, and then the servers that the user has access to through the group may be determined based on the role of the user.

At step 440 a determination may be made as to whether the user has access privileges to the requested server, either through their own access rights as determined at step 430 or through their group membership as determined at step 435. If the user does not have access to the requested server, an error may be returned at step 425. The error may indicate that the user does not have access to the requested server.

If the user is determined to have access to the requested server, at step 445 the user and/or group keys for accessing the server may be requested. The requested keys may be private keys used for authenticating with the server. The requested keys may be stored by the connection manager 250.

At step 450 the user's access to the requested keys may be verified. An operating system of the connection manager, such as the operating system 360, may be configured to restrict access to files. The user and group rights may be defined in the operating system. Prior to permitting access to the requested keys, the operating system may verify that either the user's system account has access to the requested keys or a system group that the user is a member of has access to the requested keys.

At step 455 a determination may be made as to whether the verification was successful. If the operating system does not allow access to the requested keys, a security issue may be flagged at step 460. An error may be reported, such as to an administrator of the system, indicating that a possible security breach has occurred. A request for keys that a user is not permitted to access may indicate that the connection manager software has been compromised. Various actions may be performed in response to determining that there was a request for keys at step 445 that the requesting user does not have access to. The user's account may be locked, the group may be locked, the connection manager 250 may be temporarily placed in an offline mode, and/or other actions may be taken.

If the verification was determined to be successful at step 455, the requested keys may be retrieved at step 465. A username and/or port for connecting to the requested server may be retrieved. At step 470 the retrieved keys may be used to open a session, or in other words establish a connection, with the requested server. The connection may be established via a port associated with the key used for connecting to the server. Public key authentication may be used to establish the connection with the requested server, such as SSH public key authentication. In addition to or instead of retrieving keys at step 465, a username and/or password may be retrieved. The username and/or password may be used to authenticate with the requested server at step 470, such as through HTTPS authentication.

At step 475 communications between the client device and the server may be coordinated, such as by the connection manager 250. Communications received from the client device may be decrypted. The communications may then be encrypted and transmitted to the server. Conversely, communications received from the server may be decrypted, and then encrypted and transmitted to the client device. To the client device and/or the server, it may appear that the communications are being transmitted directly between the two devices, without any interference. To the user of the client device, the connection may appear to be an SSH session directly connecting the client device and the server without any intermediate device.

At step 480 all or a portion of the communications between the client device and the server may be recorded. The recorded communications may comprise decrypted communications. Timestamps corresponding to each of the communications may be recorded. The recording may be performed by a text program recorder, such as a TTY recorder. The recording may be in a text format, video format, or any other suitable format. The recording may be searchable. The recording may be used to replay the session between the client device and the server.

At step 485 a request to terminate the connection between the client device and the server may be received. The request may be received from the client device and/or the server. The request may be automatically generated after a pre-determined period of inactivity. Rather than receiving a request, the connection manager may determine, after a pre-determined period of inactivity, to terminate the connection.

At step 490 the recorded communications between the client device and the server may be stored. The recorded communications may be stored in a database or other data structure. The recorded communications may be transmitted to another device for storage. The recorded communications may be encrypted prior to storage.

At step 495 the connection between the client device and the server may be terminated. The connection manager may terminate the connection with the server. An indication that the connection has been terminated may be transmitted to the client and/or the server. A request to establish another connection may be received from the client. Because the user has already been authenticated with the connection manager, if another request has been received the authentication between the client device and the connection manager may be skipped.

Figure 5:
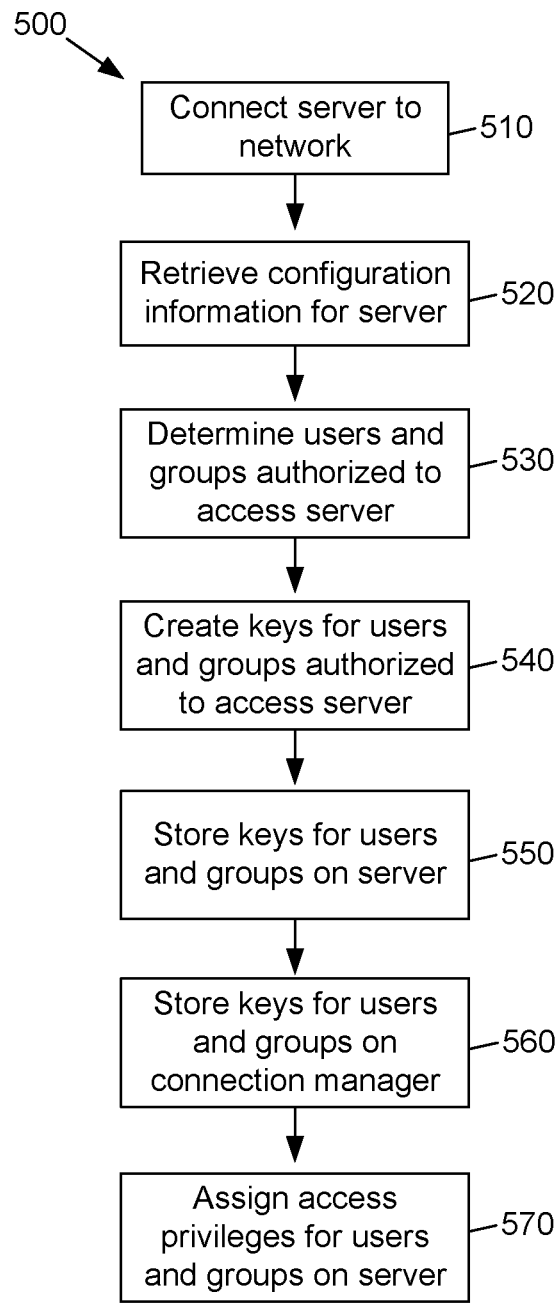
FIG. 5 is a flow diagram of a method for configuring a server according to one or more illustrative aspects of the disclosure.

FIG. 5 is a flow diagram of a method 500 for configuring a server according to one or more illustrative aspects of the disclosure. In one or more embodiments, the method 500 or one or more steps thereof may be performed by one or more computing devices or entities. Without limitation, all or portions of the method 500 may be executed by the connection manager 250 and/or servers 260-62. All or portions of the method 500 may be performed by components of the computing device 100. The method 500 or one or more steps thereof may be embodied in computer-executable instructions that are stored in a computer-readable medium, such as a non-transitory computer-readable medium. Some steps or portions of steps in the flow diagram may be omitted or changed in order.

At step 510 a server may be connected to a network and/or activated. The server may comprise one of the servers 260-62. The server may be located in a data center. The server may be a Linux server, Unix server, Windows server, or any other type of server.

At step 520 configuration information corresponding to the server may be retrieved. The configuration information may indicate which users and/or groups are authorized to access the server. The configuration information may indicate access rights for the users and/or groups. The configuration information may be retrieved from a database storing configuration information for the network.

At step 530 the configuration information may be used to determine the users and/or groups authorized to access the server. The access privileges of each user and/or group may also be determined, such as whether the user or group has root privileges.

At step 540 keys may be created for the users and groups authorized to access the server. The keys may be generated via SSH commands, or through other methods. Although step 540 describes creating keys, the keys for the users and/or groups authorized to access the server may have previously been created. Once a private key has been created for a group, a public key corresponding to that private key may be stored on each server that the group has access to. Similarly, once a private key has been created for a user, a public key corresponding to that private key may be stored on each server that the user has access to.

At step 550 public keys corresponding to the users and groups may be stored on the server. At step 560 private keys corresponding to the users and groups may be stored on a connection manager.

At step 570 the server may be configured to provide the access privileges defined in the configuration for each user and group. Systems users may be defined in the server based on the configuration. The connection manager may be configured based on the configuration. The connection manager may be configured to indicate which groups and/or users have access to the server.

Figure 6:
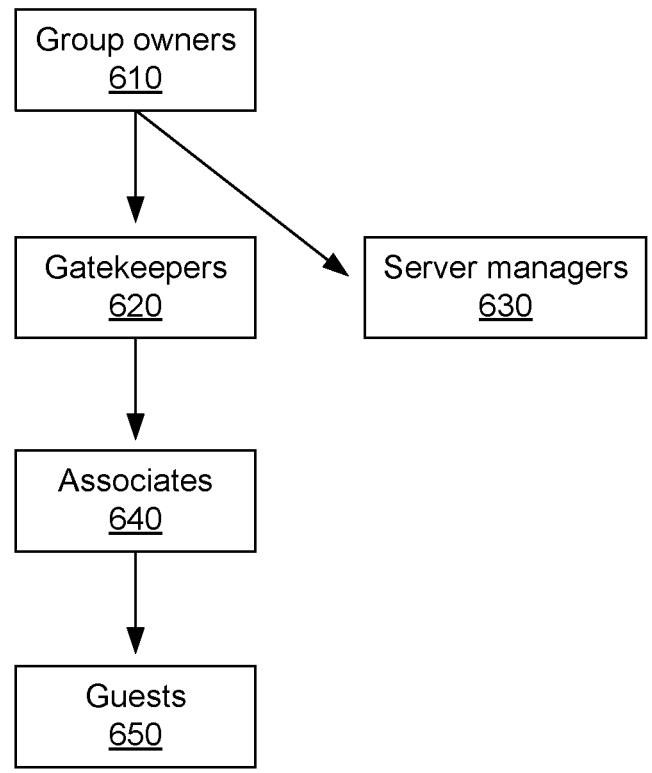
FIG. 6 shows an example of group roles according to one or more illustrative aspects of the disclosure.

FIG. 6 shows an example of group roles according to one or more illustrative aspects of the disclosure. Each user may be assigned one or more roles within a group. Users having different roles within the group may be permitted to perform different actions pertaining to the group. FIG. 6 provides one example of a hierarchy of roles within a group, but other configurations may be used.

One or more group owners 610 may be permitted to perform all administrative actions corresponding to the group. The group owners 610 may add group owners 610 and/or delete group owners 610. The group owners 610 may assign and/or remove roles from any users of the group. For example, a group owner 610 may assign a gatekeeper 620 role to one of the users of the group.

The gatekeepers 620 may add and/or remove associates 640 and/or guests 650 from the group. A list of associates 640 and/or guests 650 for the group may be maintained, such as by the connection manager 250. The gatekeepers 620 may add or remove users from the list, and may store an indication in the list of whether each user is an associate 640 or guest 650. For each guest 650, the gatekeepers 620 may determine which servers the guest 650 has access to. Each guest 650 may be given access to a subset of the set of servers that the associates 640 of the group can access. Different guests 650 of the same group may be given access to different servers.

The server managers 630 may manage a list of servers that the group can access. The server managers 630 may add and/or remove servers from the list of servers that the group can access. The server managers 630 may store an indication in the list, for each server, of a port to access the server and/or a user to log into the server as. If a server manager 630 removes a server from the list of servers, each associate 640 and guest 650 may lose access to the removed server through the group.

Associates 640 may have access to the servers associated with the group. The associates 640 may have access to each of the servers in the server list managed by the server managers 630. Associates 640 might not be permitted to modify the rights of the group. Guests 650 may have access to a subset of the servers corresponding to the group. The server managers 630 may determine which servers the guests 650 have access to.

Users in a group may have a single role or may have multiple roles. For example a single user may be a group owner 610, a gatekeeper 620, a server manager 630, and an associate 640.

Figure 7A:
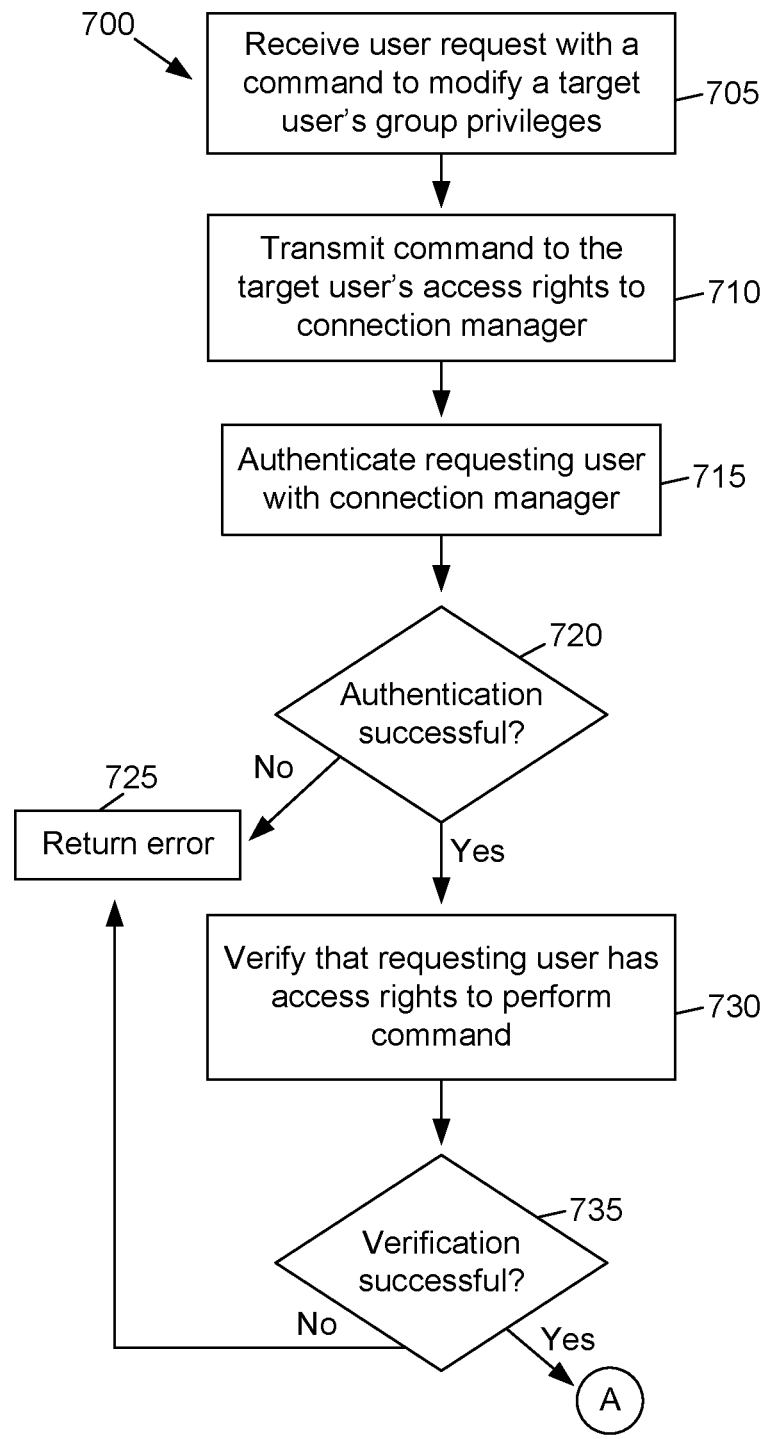
FIGS. 7A and 7B are a flow diagram of a method for modifying access rights according to one or more illustrative aspects of the disclosure.
Figure 7B:
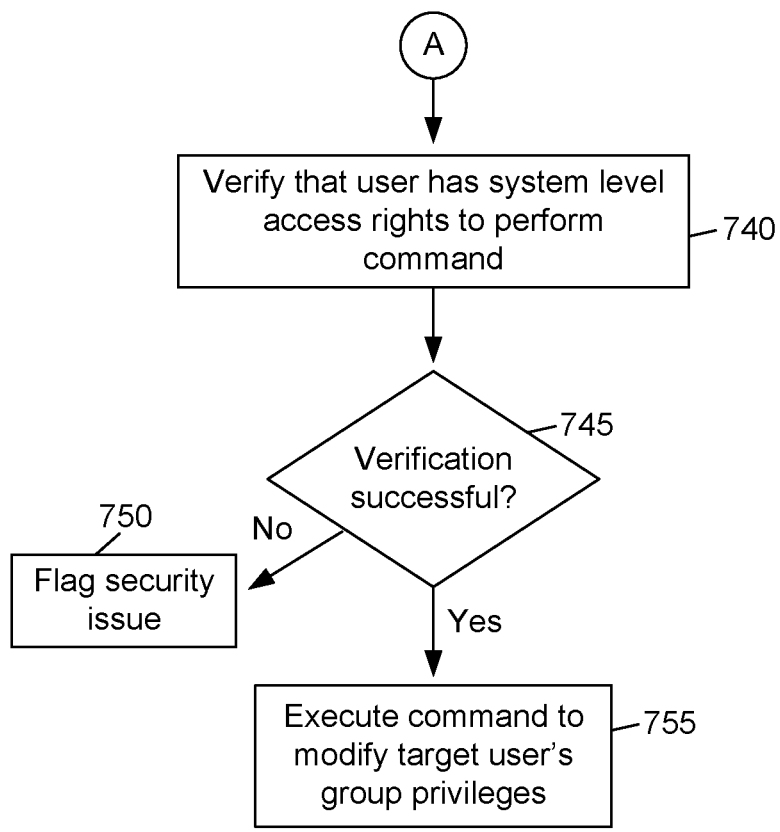

FIGS. 7A and 7B are a flow diagram of a method 700 for modifying access rights according to one or more illustrative aspects of the disclosure. In one or more embodiments, the method 700 or one or more steps thereof may be performed by one or more computing devices or entities. Without limitation, all or portions of the method 700 may be executed by the client devices 210-13 and/or the connection manager 250. All or portions of the method 700 may be performed by components of the computing device 100. The method 700 or one or more steps thereof may be embodied in computer-executable instructions that are stored in a computer-readable medium, such as a non-transitory computer-readable medium. Some steps or portions of steps in the flow diagram may be omitted or changed in order.

At step 705 a user request may be received. The user request may comprise a command to modify a target user's access rights. The user request may be received at a client device, such as one of the client devices 210-13. The user request may comprise a username and/or other identifying information of the target user. The user request may comprise a group name and/or other identifying information corresponding to the group. The user request may indicate the command to be performed. The command may comprise a request to add the target user to the group, remove the target user from the group, and/or change the target user's role within the group.

At step 710 the command may be transmitted to a connection manager, such as the connection manager 250. At step 715 the requesting user may be authenticated with the connection manager. Similar actions may be performed at step 715 as those described above in regards to step 415. At step 720 a determination may made as to whether the authentication was successful. If the authentication was not successful, at step 725 an error may be returned.

If the authentication was successful at step 720, at step 730 a verification may be performed to determine whether the requesting user has access rights to perform the command. The role of the requesting user within the group may be determined. The requesting user may be determined to be a group owner 610, gatekeeper 620, server manager 630, associate 640, and/or guest 650. Whether the requesting user has rights to perform the requested action may be determined based on the role or roles of the requesting user within the group.

At step 735 the verification may be determined to be successful or to have failed. If the command is a request to add or remove the target user from the group, but the requesting user is not assigned a role that permits adding or removing users from the group, the verification may fail. If the verification fails, an error may be returned at step 725.

If the verification is successful at step 735 because the requesting user has sufficient privileges to perform the command, a system level verification may be performed at step 740.

At step 740 an operating system may verify that the user has system level access rights to perform the command. An operating system of the connection manager, such as the operating system 360, may be configured to restrict access to commands. The user and group rights may be defined in the operating system. Prior to executing the command, the operating system may verify that either the user's system account has access to the command or a system group that the user is a member of has access to the command.

Access to all or a portion of executable code corresponding to the command may be controlled by the operating system. The executable code may be stored in one or more files. Access to the one or more files may be controlled by the operating system. The operating system may grant access to the executable code after determining that a system group corresponding to the user or the user's system account has access to the executable code.

At step 745 a determination may be made as to whether the verification was successful. If the verification fails and the operating system does not allow access to the command, a security issue may be flagged at step 750. An error may be reported, such as to an administrator of the system, indicating that a possible security breach has occurred. The verification being denied at step 745 may indicate that the connection manager software has been compromised. Various actions may be performed in response to determining that the verification was denied at step 745. The user's account may be locked, the group may be locked, the connection manager 250 may be temporarily placed in an offline mode, and/or other actions may be taken.

After successfully verifying that the user is authorized to execute the command, the command may be executed at step 755. At step 755 the target user's group privileges may be modified. An indication that the modification has been performed may be transmitted and/or displayed to the user. Method 700 describes modifying the group access rights of a target user, but it should be understood that similar steps may be performed for modifying the list of servers accessible by the group, and/or for performing any other administrative task corresponding to the group.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method comprising:
   receiving, from a client device, a request to establish a connection with a server, wherein the request indicates a user of the client device;
   authenticating, using a public key corresponding to the client device, the user;
   determining whether the user has privileges to access the server;
   after determining that the user is authorized to access the server, verifying, by an operating system, whether an operating system account of the user is permitted to access a private key corresponding to the server;
   after verifying that the operating system account of the user is permitted to access the private key, retrieving the private key;
   establishing, using the private key, a connection to the server;
   receiving, from the client device, encrypted communications;
   decrypting the encrypted communications, thereby generating decrypted data;
   encrypting the decrypted data for the server, thereby generating encrypted data; and
   transmitting the encrypted data to the server.

2. The method of claim 1, further comprising coordinating communications between the client device and the server.

3. The method of claim 2, further comprising recording the communications between the client device and the server by recording the decrypted data.

4. The method of claim 3, further comprising:
   storing the recorded communications between the client device and the server; and
   outputting, via a user interface, the stored communications.

5. The method of claim 2, wherein coordinating communications between the client device and the server further comprises:
   decrypting communications from the server;
   encrypting the decrypted communications for the client device, thereby generating second encrypted data; and
   transmitting the second encrypted data to the client device.

6. The method of claim 1, further comprising:
   retrieving an indication of one or more groups corresponding to the user; and
   determining whether the one or more groups are authorized to access the server.

7. The method of claim 6, wherein the private key comprises a private key corresponding to a group of the one or more groups.

8. The method of claim 1, further comprising:
   receiving, from the client device, a request to execute a command to modify a second user's role in a group;
   determining whether the user has privileges to execute the command; and
   after determining that the user has privileges to execute the command, executing the command, thereby modifying the second user's role in the group.

9. The method of claim 1, wherein the private key is accessible by a plurality of users.

10. The method of claim 1, further comprising verifying, by aft the operating system, that the user is a member of an operating system group that has access to the private key corresponding to the server.

11. The method of claim 10, wherein the operating system group comprises a system group of the operating system.

12. An apparatus comprising:
    at least one processor; and
    a memory device comprising executable instructions, which, when executed by the at least one processor, cause the apparatus to:
       receive, from a client device, a request to establish a connection with a server, wherein the request indicates a user of the client device;
       authenticate, using a public key corresponding to the client device, the user;
       determine whether the user has privileges to access the server;

after determining that the user is authorized to access the server, verify, by an operating system of the apparatus, whether an operating system account of the user is permitted to access a private key corresponding to the server;

after verifying that the operating system account of the user is permitted to access the private key, retrieve the private key;

establish, using the private key, a connection to the server;

receive, from the client device, encrypted communications;

decrypt the encrypted communications, thereby generating decrypted data;

encrypt the decrypted data for the server, thereby generating encrypted data; and transmit the encrypted data to the server.

13. The apparatus of claim 12, wherein the instructions that cause the apparatus to determine whether the user has privileges to access the server comprise instructions that cause the apparatus to determine, based on data stored by the apparatus, that the user is authorized to access the server.

14. The apparatus of claim 12, wherein the instructions further cause the apparatus to:

receive, from the server, second encrypted communications;

decrypt the second communications from the server, thereby generating second decrypted data;

encrypt the second decrypted data, thereby generating second encrypted data; and transmit the second encrypted data to the client device.

15. A system comprising:

a first computing device, a second computing device, and a third computing device, wherein the first computing device comprises:

at least one processor; and a memory device comprising executable instructions, which, when executed by the at least one processor of the first computing device, cause the first computing device to:

transmit, to the second computing device and based on a private key corresponding to the second computing device, a request to establish a communication session with the third computing device; and after receiving an indication that the communication session has been established, transmit encrypted data to the second computing device, wherein the second computing device comprises:

at least one processor; and a memory device comprising executable instructions, which, when executed by the at least one processor of the second computing device, cause the second computing device to:

receive the request to establish the communication session with the third computing device;

authenticate, based on a public key corresponding to the private key of the first computing device, the first computing device;

determine whether the first computing device has privileges to access the third computing device;

after determining that the first computing device has privileges to access the third computing device, verify, by an operating system of the second computing device, whether an operating system account of a user is permitted to access the private key corresponding to the third computing device;

after verifying that the operating system account of the user is permitted to access the private key, retrieve the private key; and establish, using the private key, the communication session with the third computing device;

receive, from the first computing device, the encrypted data;

decrypt the encrypted data, thereby generating decrypted data;

encrypt the decrypted data for the third computing device, thereby generating second encrypted data; and transmit the second encrypted data to the third computing device, and wherein the third computing device comprises:

at least one processor; and a memory device comprising executable instructions, which, when executed by the at least one processor of the third computing device, cause the third computing device to:

receive, from the second computing device, a request to establish the communication session;

authenticate, based on a public key corresponding to the private key of the second computing device, the second computing device; and receive, from the second computing device, the second encrypted data.

16. The system of claim 15, wherein the executable instructions, when executed by the at least one processor of the second computing device, cause the second computing device to:

coordinate communications between the first computing device and the third computing device; and record the communications between the first computing device and the third computing device.

17. The system of claim 15, wherein the executable instructions, when executed by the at least one processor of the second computing device, cause the second computing device to determine, based on data stored by the second computing device, that the first computing device has privileges to access the third computing device.

* * * * *

UNITED STATES PATENT AND TRADEMARK OFFICE
CERTIFICATE OF CORRECTION

| | |
|---|---|
| PATENT NO. | : 11,265,327 B2 |
| APPLICATION NO. | : 16/678374 |
| DATED | : March 1, 2022 |
| INVENTOR(S) | : Stéphane Lesimple |

Page 1 of 1

It is certified that error appears in the above-identified patent and that said Letters Patent is hereby corrected as shown below:

In the Claims

Column 16, Claim 10, Lines 50-54, should read --The method of claim 1, further comprising verifying, by the operating system, that the user is a member of an operating system group that has access to the private key corresponding to the server.--

Signed and Sealed this
Fifth Day of July, 2022

Katherine Kelly Vidal
*Director of the United States Patent and Trademark Office*